L. Ferguson,
Steam Trap.

No. 27,625. Patented Mar. 27, 1860.

Witnesses;
H. G. Blaisdell
J. C. Blaisdell

Inventor;
Levi Ferguson

UNITED STATES PATENT OFFICE.

LEVI FERGUSON, OF LOWELL, MASSACHUSETTS.

STEAM-TRAP.

Specification of Letters Patent No. 27,625, dated March 27, 1860.

*To all whom it may concern:*

Be it known that I, LEVI FERGUSON, of Lowell, in the county of Middlesex and State of Massachusetts, have invented a new and useful Improvement in Steam-Traps; and I do hereby declare that the following is a full, clear, and exact description of the same, reference being had to the accompanying drawings, forming part of this specification, in which—

Figure 1:
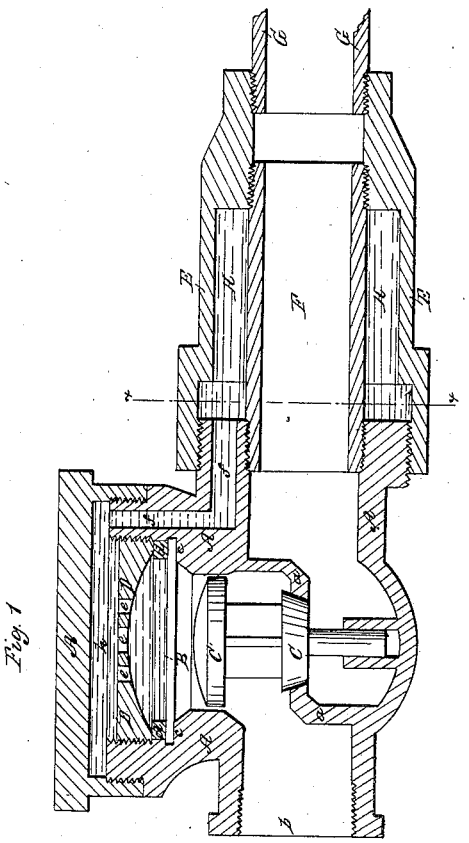
Figure 2:
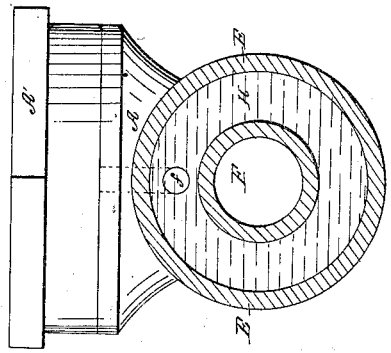

Figure 1, is a central vertical section of a steam trap constructed according to my invention. Fig. 2, is a transverse section of the same in the plane indicated by the line $x, x$, of Fig. 1.

Similar letters of reference indicate corresponding parts in both figures.

My invention relates to that kind of steam trap in which the operation of the water escape valve is controlled by a flexible diaphragm which is acted upon by the expansion and contraction of the liquid in a vessel heated by the water or steam in the escape pipe.

The improvement consists in a novel arrangement of the valve the diaphragm and the chamber relatively to each other and to the escape pipe whereby the valve is rendered more sensitive and a freer escape for the water and sediment is provided than in other steam traps operating on the same principle.

To enable others skilled in the art to make and use my invention I will proceed to describe its construction and operation.

A, represents the valve box having the valve seat $a$, arranged in the same manner as the seat of what is generally known as a steam stop valve.

C, is the valve having a broad head C', which enters the wide circular portion of the valve box above the outlet $b$.

B, is the flexible diaphragm made of vulcanized india rubber or other suitable material fitted into the wide circular upper portion of the valve box and secured in place between a shoulder $c$, formed within the box and a ring $d$, which is held in place by a plate D, which is screwed into the top of the valve box. This plate D, is made concave on its under side to allow play for the diaphragm B, and is provided with several orifices $e, e;$ and a space $h$, is left between the said plate and the cover A', of the valve box.

E, F, is a double cylindrical or annular box screwed or otherwise secured to the inlet side of the valve box A, in such manner that its inner cylinder F, forms a continuation of the escape pipe G, into the valve box, the said pipe G, being screwed into or otherwise attached to the said box to make such continuation. The annular space H, between the cylinders F, E, constitutes the principal portion of the chamber to contain the water or other fluid by whose expansion and contraction and consequent action on the diaphragm B, the operation of the valve C, is controlled.

$f$, is a passage provided in the valve box to form communication between the space H, and the space $h$, the said passage and space $h$, combining with the space H, to constitute the expansion chamber which is to be wholly or nearly filled with water or other liquid.

The operation of the apparatus is as follows. The pressure of steam in the apparatus tends to force open the valve C, but when the space within F, is filled with steam it heats the liquid in H, to such a degree that by its expansion the diaphragm B, is forced down upon the valve and caused to keep it closed. As water accumulates in F, by condensation, and fills the space F, such water soon becomes cooler than the steam, for it is exposed on all sides but one to cooling influences, and the liquid in H, consequently becomes cooler also, and contracts to such a degree as to allow the valve to be opened by the pressure of steam upon the water, and the latter is driven out down to the level of the valve seat. As the steam enters the space F, again, the liquid in H, will be heated again, and by its expansion the diaphragm, G, will be forced down upon, and caused to close the valve again.

The superiority of this arrangement of the parts of the apparatus over other arrangements consists principally in the fact that the steam passes through the expansion chamber before reaching the valve and so heats it up more quickly than it would if it had to pass the valve before passing the chamber. Another advantage is that a more free escape is provided for the water of condensation and any sediment that may be deposited in it.

What I claim as my invention and desire to secure by Letters Patent, is,

The arrangement of the annular chamber H, h, in combination with the valve and diaphragm substantially as herein described for the purpose set forth.

LEVI FERGUSON.

Witnesses:
H. G. BLAISDELL,
T. C. BLAISDEL.